US009473283B2

(12) United States Patent
Yang et al.

(10) Patent No.: US 9,473,283 B2
(45) Date of Patent: Oct. 18, 2016

(54) METHOD, DEVICE AND SYSTEM FOR PERFORMING NAV CONTROL ON NODE AND NODE (71) Applicant: Huawei Technologies Co., Ltd., Shenzhen (CN)

(72) Inventors: Guorui Yang, Shenzhen (CN); Xuehuan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 220 days.

(21) Appl. No.: 14/196,568

(22) Filed: Mar. 4, 2014

(65) Prior Publication Data
US 2014/0185557 A1 Jul. 3, 2014

Related U.S. Application Data (63) Continuation of application No. PCT/CN2012/081493, filed on Sep. 17, 2012.

(30) Foreign Application Priority Data

Sep. 15, 2011 (CN) .......................... 2011 1 0273817

(51) Int. Cl.
H04W 4/00 (2009.01)
H04L 5/00 (2006.01)
H04W 74/08 (2009.01)

(52) U.S. Cl.
CPC ........ *H04L 5/0058* (2013.01); *H04W 74/0816* (2013.01)

(58) Field of Classification Search
CPC .... H04W 72/04; H04W 88/08; H04W 76/00
See application file for complete search history.

(56) References Cited

U.S. PATENT DOCUMENTS

2004/0233876 A1* 11/2004 Nakashima ............... H04L 1/18
370/338
2006/0140172 A1* 6/2006 Trainin ................. H04W 99/00
370/352

(Continued)

FOREIGN PATENT DOCUMENTS

CN 101223731 A 7/2008
CN 101366241 A 2/2009

(Continued)

OTHER PUBLICATIONS

IEEE Computer Society, "IEEE Standard for Information Technology—Telecommunications and Information exchange between systems—Local and metropolitan area networks—Specific requirements, Part 11: Wireless LAN Medium Access Control (MAC) and Physical Layer (PHY) Specifications—Amendment 5: Enhancements for Higher Throughput" 802.11n™—2009, 536 pages.

*Primary Examiner* — Hassan Phillips
*Assistant Examiner* — Siren Wei
(74) *Attorney, Agent, or Firm* — Brinks Gilson & Lione (57) ABSTRACT The present disclosure discloses a method, a device and a system for performing NAV control on a node and a node. The method includes: updating a local NAV value to a preset first value when it is determined that a preset first field of a monitored MAC frame carries a first identity, wherein the first value is less than a current local NAV value and the MAC frame of which the preset first field carriers the first identity is transmitted by a TXOP responder after receiving a last MAC frame transmitted by a TXOP holder. The method, device, system and node may enable a hidden station to enter a channel access competition state timely, thereby solving a problem of regional discrimination of a station.

10 Claims, 7 Drawing Sheets (56) References Cited

U.S. PATENT DOCUMENTS

| | | | |
|---|---|---|---|
| 2007/0115882 A1* | 5/2007 | Wentink | H04N 21/4126 370/329 |
| 2010/0135268 A1* | 6/2010 | Seok | H04W 74/0816 370/338 |
| 2011/0069628 A1 | 3/2011 | Liu et al. | |
| 2012/0008599 A1* | 1/2012 | Marin | H04W 74/006 370/336 |
| 2012/0327870 A1* | 12/2012 | Grandhi | H04W 28/06 370/329 |

FOREIGN PATENT DOCUMENTS

| | | |
|---|---|---|
| CN | 101394626 A | 3/2009 |
| CN | 101714896 A | 5/2010 |
| CN | 102067634 A | 5/2011 |
| EP | 2051559 A2 | 4/2009 |
| EP | 2120507 A1 | 11/2009 |
| WO | WO 03/079708 A1 | 9/2003 |
| WO | WO 2006/133414 A2 | 12/2006 |
| WO | WO 2010/103415 A1 | 9/2010 |

* cited by examiner

updating a local NAV value to a preset first value when it is determined that a preset first field of a monitored MAC frame carries a first identity, wherein the first value is less than a current local NAV value and the MAC frame of which the preset first field carriers the first identity is transmitted by a TXOP responder after receiving a last MAC frame transmitted by a TXOP holder ⟋ 301

METHOD, DEVICE AND SYSTEM FOR PERFORMING NAV CONTROL ON NODE AND NODE

CROSS-REFERENCE TO RELATED APPLICATIONS

This application is a continuation of International Application No. PCT/CN2012/081493, filed on Sep. 17, 2012, which claims priority to Chinese Patent Application No. 201110273817.2, filed on Sep. 15, 2011, both of which are hereby incorporated by reference in their entireties.

FIELD OF TECHNOLOGY

The present disclosure relates to a field of communication, in particular to a method, a device and a system for performing network allocation vector (NAV) control on a node and a node.

BACKGROUND

Figure 1:
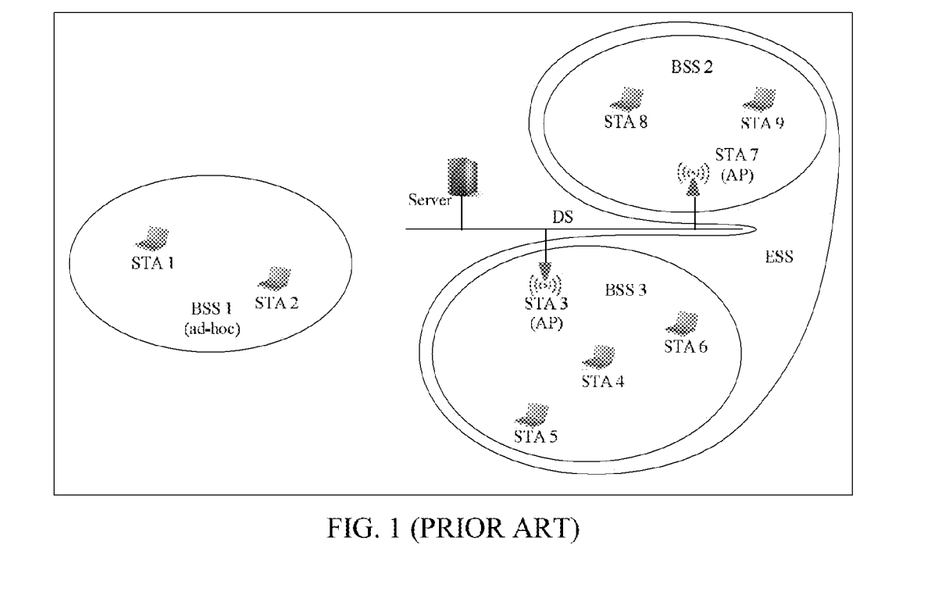
FIG. 1 is schematic diagram of a structure of a WLAN in the prior art.

A basic component of a wireless local area network (WLAN) based on an IEEE 802.11 technology is a basic service set (BSS), which consists of stations (STAs) with certain association in a certain area of specific coverage, such as a second basic service set (BSS2) and a third basic service set (BSS3) shown in FIG. 1. In a BSS network, a central station for specially managing the BSS is named as an access point (AP), and other stations (STAs) in the network are associated with the AP. An extended service set (ESS) may be formed by connecting multiple BSS networks with each other through a distribution system (DS). In addition, in the absence of the AP, the stations (STAs) may organize a network by themselves to directly communicate with each other, and this network is an independent basis service set (IBSS), such as a first basic service set (BSS1) shown in FIG. 1. In embodiments of the present disclosure, the access point (AP) and the station (STA) are collectively named as nodes.

Figure 2:
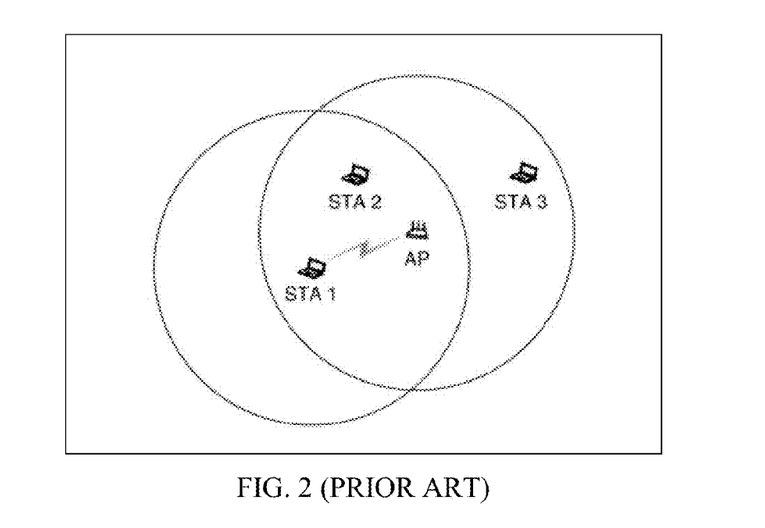
FIG. 2 is an example diagram of a hidden node problem in the prior art.

Distribution nature of channel access of the WLAN based on the IEEE 802.11 technology brings that a carrier monitoring mechanism is crucial for a collision-free operation. A physical carrier monitoring mechanism logically existing in a PHY layer takes charge of detecting transmission of other nodes. However, due to a reason such as a geographic position, physical carrier monitoring may not detect transmission of all the nodes, namely a hidden node problem exists. For example, as shown in FIG. 2, a data transmission path is established between a first station (STA 1) and an access point (AP), and a signal transmitted from the first station (STA 1) may be detected by the access point (AP) and a second station (STA 2), but for a remote node, a third station (STA 3), only a signal transmitted from the access point (AP) may be detected and a signal of the first station (STA 1) may not be detected. When the first station (STA 1) transmits a signal to the access point (AP), the third station (STA 3) may still think that a channel is in an idle state, thereby causing interference to receiving the signal of the first station (STA 1) by the access point (AP).

A network allocation vector (NAV) is a mechanism which may be used for overcoming the above-mentioned hidden node problem. A function of NAV is located on a MAC layer, and provides a virtual carrier monitoring mechanism to enhance physical carrier monitoring. The mechanism is mainly realized by setting a NAV value in each node. Specifically, when a certain node A transmits a MAC frame to a certain target node, NAV values of all stations (except a target station successfully demodulating the MAC frame) under the coverage of the node A are updated according to a time length field borne in a frame header of the MAC frame. The time length field includes a time value using a microsecond (us) as a unit, and the value may be a continuous time length from the end of the last physical layer convergence procedure (PLCP) protocol data unit (PPDU, PLCP protocol data unit) bearing the MAC frame, in which channel resources are in an occupied state.

In 802.11e, another important concept, namely a transmit opportunity (TXOP) is introduced, which means a bounded time period in which a node may transmit a specific communication category and may be acquired through a competition mechanism of a competition period. Within a TXOP time limit, a certain node exclusively occupies a channel resource and may continuously transmit a data frame, a control frame and a management frame and may receive a MAC response frame. The TXOP has a longest time limit, and when this is ended, a TXOP may be acquired through re-competition. Correspondingly, in enhanced distributed channel access (EDCA), each access category (AC) may also independently acquire the TXOP and exclusively occupy the channel resource. A node which has acquired the TXOP is named as a TXOP holder, and a node correspondingly establishing a transmission link with the TXOP holder is named as a TXOP responder.

After the TXOP holder successfully acquires the TXOP, the TXOP holder and the TXOP responder set NAV values for stations under the coverage of the TXOP holder and the TXOP responder through exchange of a first pair of MAC frames to forbid the stations to access to the channel resource within a NAV time period, unless a station is required by the TXOP holder to become the TXOP responders, and the station feeds back a MAC response frame. In the subsequent TXOP time period, a node setting the NAV continues to monitor a MAC frame it received, and if a destination address of the monitored MAC frame does not match with a local address, a local NAV value is updated according to a field value of a time length field in the MAC frame, and if the destination address matches with the local address, a NAV value stored locally is not updated. In addition, the NAV value in each node may decrease continuously over time, and when the NAV value is 0, a node being set the NAV value may perform competition for channel access through the physical carrier monitoring mechanism. If the TXOP holder discovers that a transmission sequence is null (no service data needs to be transmitted) within the TXOP time limit and it is needed to end the TXOP ahead of time, and the length of the remaining time of the current TXOP exceeds the length of a time for retransmitting a CF_End frame, the TXOP holder transmits the CF_End frame to abandon a right to access to the channel resource, wherein a field value of a time length field in the CF_End frame is 0. The other stations under the coverage of the TXOP holder monitor the CF_End frame, clear the NAV values stored locally according to the field value of the time length field and may perform competition for channel access through the physical carrier monitoring mechanism.

However, the inventor discovers that, the CF_End frame transmitted by the TXOP holder only enables the NAV value of a station under the coverage of the TXOP holder to be updated to 0. A hidden station may not receive the CF_End frame because it is not under the coverage of the TXOP holder, so the NAV value of the hidden station may not change. The hidden station may only continue to wait until the local NAV value decreases to 0 and may enter a channel access competition state. The time of entering the channel access competition state of the hidden station is apparently later than that of a node under the coverage of the TXOP holder. Therefore, the hidden station may not enter the channel access competition state timely according to the situation that the TXOP is ended ahead of time, thus a problem of regional discrimination of a station exists.

SUMMARY

Accordingly, the technical problem to be solved by the present disclosure is to provide a method, a device and a system for performing NAV control on a node and a node, which enable a hidden node to enter a channel access competition state timely, thereby solving a problem of regional discrimination of a station.

Therefore, embodiments of the present disclosure adopt the following solutions.

An embodiment of the present disclosure provides a method for performing NAV control on a node, including: updating a local NAV value to a preset first value when it is determined that a preset first field of a monitored MAC frame carries a first identity, wherein the first value is less than a current local NAV value and the MAC frame of which the preset first field carriers the first identity is transmitted by a TXOP responder after receiving a last MAC frame transmitted by a TXOP holder.

An embodiment of the present disclosure also provides a method for performing NAV control on a node, including: receiving a MAC frame transmitted by a TXOP holder; transmitting a MAC response frame corresponding to the MAC frame to the TXOP holder when it is determined according to a field value of a preset second field in the MAC frame that the MAC frame is a last MAC frame transmitted by the TXOP holder, wherein a preset first field of the MAC response frame carries a first identity, and the first identity is used for instructing a node monitoring the MAC response frame to update a local NAV value to a first value.

An embodiment of the present disclosure provides a device for performing NAV control on a node, including: an updating unit, configured to update a local NAV value to a preset first value when it is determined that a preset first field of a monitored MAC frame carries a first identity, wherein the first value is less than a current local NAV value and the MAC frame of which the preset first field carriers the first identity is transmitted by a TXOP responder after receiving a last MAC frame transmitted by a TXOP holder.

An embodiment of the present disclosure provides a device for performing NAV control on a node, including: a first receiving unit, configured to receive a MAC frame transmitted by a TXOP holder; a first transmitting unit, configured to transmit a MAC response frame corresponding to the MAC frame to the TXOP holder when it is determined according to a field value of a preset second field in the MAC frame that the MAC frame is a last MAC frame transmitted by the TXOP holder, wherein a preset first field of the MAC response frame carries a first identity, and the first identity is used for instructing a node monitoring the MAC response frame to update a local NAV value to a first value.

An embodiment of the present disclosure provides a node, including: an updating unit, configured to update a local NAV value to a preset first value when it is determined that a preset first field of a monitored MAC frame carries a first identity, wherein the first value is less than a current local NAV value and the MAC frame of which the preset first field carriers the first identity is transmitted by a TXOP responder after receiving a last MAC frame transmitted by a TXOP holder.

An embodiment of the present disclosure provides a system for performing NAV control on a node, including: a TXOP holder, configured to transmit a last MAC frame to a TXOP responder, wherein a field value of a preset second field in the last MAC frame is used for indicating for the TXOP responder that the MAC frame is the last MAC frame transmitted by the TXOP holder, and receive a MAC response frame transmitted by the TXOP responder and corresponding to the last MAC frame, wherein a preset first field of the MAC response frame carries a first identity and the first identity is used for instructing a node monitoring the MAC response frame to update a local NAV value to a first value; the TXOP responder, configured to receive a MAC frame transmitted by the TXOP holder and transmit a MAC response frame corresponding to the MAC frame to the TXOP holder when it is determined according to a field value of a preset second field in the MAC frame that the MAC frame is a last MAC frame transmitted by the TXOP holder;

a first node, configured to update a local NAV value to a preset first value when it is determined that a preset first field of a monitored MAC frame carries a first identity, wherein the first value is less than a current local NAV value.

The effects of the above-mentioned solutions are analyzed as follows.

After receiving a last MAC frame transmitted by a TXOP holder, a TXOP responder transmits a MAC response frame carrying a first identity in a preset first field, and when a node in the coverage of the TXOP responder monitors the MAC frame, the node updates a local NAV value to a first value. Therefore, even if the TXOP holder abandons a right to access to a channel resource ahead of time, a hidden node may update a local NAV value to the first value according to the MAC response frame transmitted by the TXOP responder and carrying the first identity in the first field, so that the time when the hidden node enters a channel access competition state is not later than the time when a node under the coverage of the TXOP holder enters the channel access competition state, and all the nodes in the coverage of the TXOP holder and the TXOP responder may enter the channel access competition state timely, thereby solving a problem that the hidden node is unable to enter the channel access competition state timely, namely solving the problem of regional discrimination of the node.

DETAILED DESCRIPTION OF THE EMBODIMENTS

Implementation of a method, a device and a system for performing network allocation vector (NAV) control on a node and a node in the embodiments of the present disclosure is described below in details, in combination with the accompanying drawings.

Figure 3:
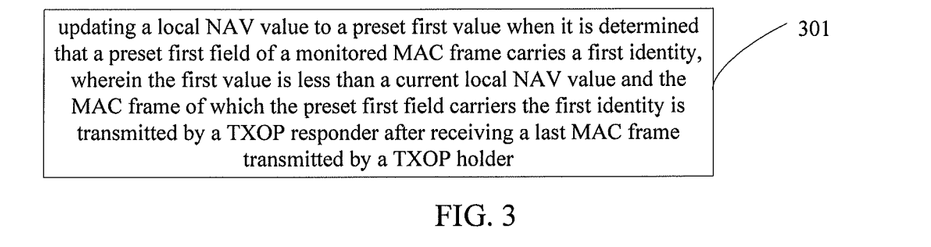
FIG. 3 is a schematic flowchart of a first method for performing NAV control on a node in an embodiment of the present disclosure.

FIG. 3 is a schematic flowchart of a method for performing NAV control on a node in an embodiment of the present disclosure. The method may be applied to a node in the coverage of a TXOP responder in a TXOP, and preferably, may be applied to a hidden node in the coverage of the TXOP responder in the TXOP but not in the coverage of a TXOP holder. As shown in FIG. 3, the method includes:

step 301: updating a local NAV value to a preset first value when it is determined that a preset first field of a monitored MAC frame carries a first identity, wherein the first value is less than a current local NAV value and the MAC frame of which the preset first field carriers the first identity is transmitted by a TXOP responder after receiving a last MAC frame transmitted by a TXOP holder.

The first value may be preset in each node, so that the updating process is performed when the MAC frame carrying the first identity in the preset first field is monitored.

In addition, the first value may be 0.

Preferably, the first value may be set as the sum of a time of a short inter-frame space (SIFS) and a time of transmission of a CF_End frame. In this case, after the hidden node updates the NAV value to the first value, the NAV value continues decreasing, During the time that the NAV value of the hidden node decreases from the first value to 0, the TXOP holder also receives the MAC frame carrying the first identity in the preset first field, and then transmits a CF_End frame to realize clearing a NAV value of a node under the coverage of the TXOP holder, The NAV values of the hidden node and the node under the coverage of the TXOP holder are updated to 0 at the same time, and the two nodes perform competition for channel access together.

Preferably, the first field may be a time length field, and the first identity may be 0.

Here, the current local NAV value is a local NAV value before the updating of the NAV value, namely a local NAV value when the MAC frame is monitored.

In the method shown in FIG. 3, after receiving the last MAC frame transmitted by the TXOP holder, the TXOP responder transmits the MAC frame carrying the first identity in the preset first field, and when the node in the coverage of the TXOP responder monitors the MAC frame, the node updates the local NAV value to the first value. Therefore, even if the TXOP holder abandons a right to access to a channel resource ahead of time, all the nodes in the coverage of the TXOP holder and the TXOP responder may enter a channel access competition state timely, thereby solving a problem that the hidden node is unable to enter the channel access competition state timely, namely solving the problem of regional discrimination of the node.

Figure 4:
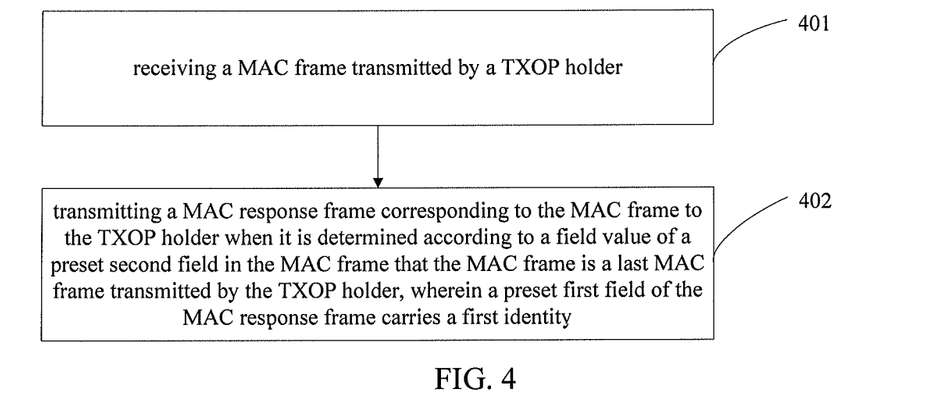
FIG. 4 is a schematic flowchart of a second method for performing NAV control on a node in an embodiment of the present disclosure.

FIG. 4 shows another method for performing NAV control on a node in an embodiment of the present disclosure. The method may be applied to a TXOP responder in a TXOP. As shown in FIG. 4, the method includes:

step 401: receiving a MAC frame transmitted by a TXOP holder;

step 402: transmitting a MAC response frame corresponding to the MAC frame to the TXOP holder when it is determined according to a field value of a preset second field in the MAC frame that the MAC frame is a last MAC frame transmitted by the TXOP holder, wherein a preset first field of the MAC response frame carries a first identity, and the first identity is used for instructing a node monitoring the MAC response frame to update a local NAV value to a first value.

In the method shown in FIG. 4, when a TXOP responder receives the MAC frame transmitted by the TXOP holder and determines the MAC frame is the last MAC frame transmitted by the TXOP holder, the TXOP responder transmits the MAC response frame carrying the first identity in the preset first field to the TXOP holder, wherein the first identity is used for instructing the node monitoring the MAC response frame to update the local NAV value to the first value. Therefore, in the TXOP, if the TXOP holder releases or abandons a right to access to a channel resource ahead of time, a hidden node may update the local NAV value to the first value when monitoring the MAC response frame, transmitted by the TXOP responder, of the last MAC frame, so as to enter a channel access competition state not later than other nodes under the coverage of the TXOP holder, thereby solving the problem that the hidden node is unable to enter the channel access competition state timely, namely solving the problem of regional discrimination of the node.

Figure 5:
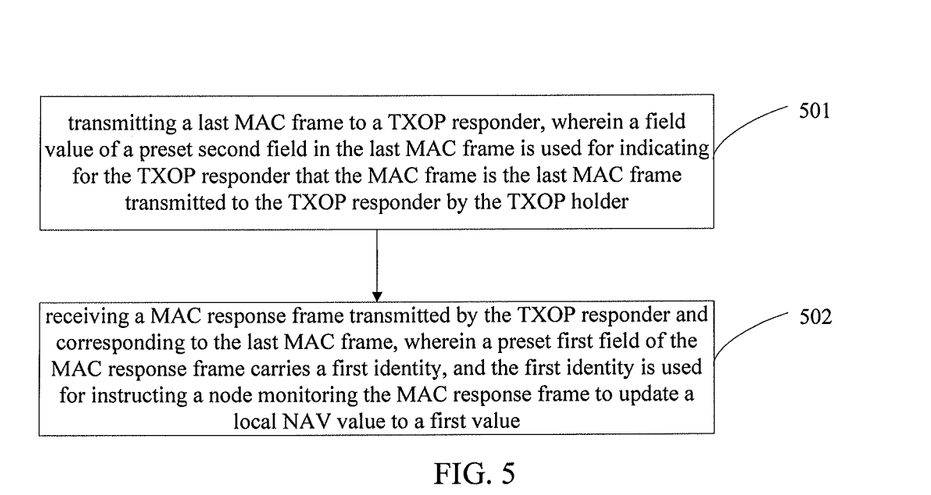
FIG. 5 is a schematic flowchart of a third method for performing NAV control on a node in an embodiment of the present disclosure.

FIG. 5 is a schematic flowchart of a third method for performing NAV control on a node in an embodiment of the present disclosure. The method may be applied to a TXOP holder in a TXOP. As shown in FIG. 5, the method includes:

step 501: transmitting a last MAC frame to a TXOP responder, wherein a field value of a preset second field in the last MAC frame is used for indicating for the TXOP responder that the MAC frame is the last MAC frame transmitted to the TXOP responder by the TXOP holder;

step 502: receiving a MAC response frame transmitted by the TXOP responder and corresponding to the last MAC frame, wherein a preset first field of the MAC response frame carries a first identity, and the first identity is used for instructing a node monitoring the MAC response frame to update a local NAV value to a first value.

In the method shown in FIG. 5, after transmitting the last MAC frame to the TXOP responder, the TXOP holder receives the MAC response frame carrying the first identity in the preset first field transmitted by the TXOP responder, so as to perform transmission of the MAC frame through cooperation with the TXOP responder, enabling a hidden node under the coverage of the TXOP responder to enter the channel access competition state timely, and solving the problem of regional discrimination of the node.

Figure 6:
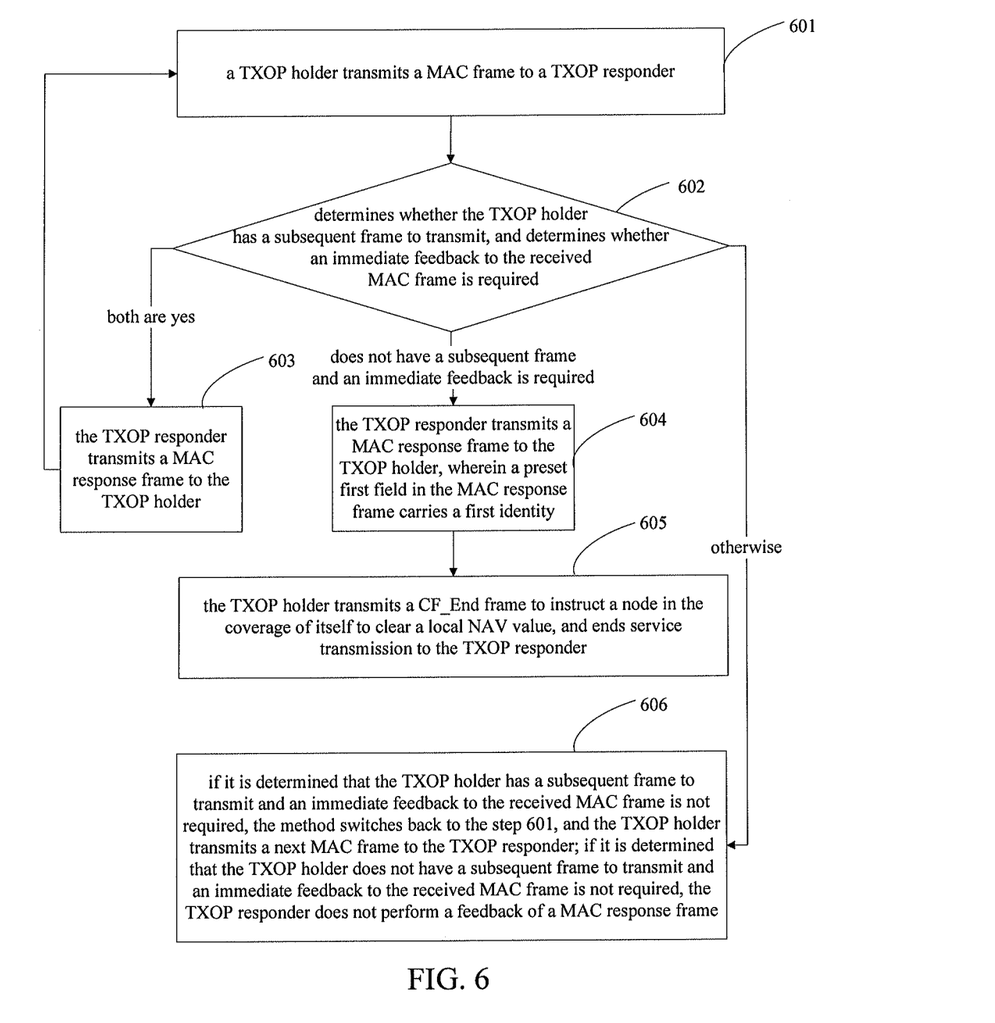
FIG. 6 is a schematic flowchart of a method for performing MAC frame exchange in a TXOP by a TXOP holder and a TXOP responder in an embodiment of the present disclosure.

An exchange process between a TXOP holder and a TXOP responder in a TXOP is described below through embodiments, so as to further illustrate the implementation of the method for performing NAV control on a node in the embodiments of the present disclosure in details. Specifically, the process is performed after a certain node wins a channel resource and determines that the current TXOP is acquired through successful exchange of a first frame. As shown in FIG. 6, the method includes:

Step 601: a TXOP holder transmits a MAC frame to a TXOP responder. A MAC frame is a field set occurring in a given sequence contained in a MAC layer, wherein each MAC frame includes a MAC frame header, a variable length frame body including information of a specific subframe type or subtype and a frame check sequence. The MAC frame may be a data frame, a management frame, a control frame or the like.

Not all fields occur in a transmitted MAC frame exchanged by the TXOP holder and the TXOP responder in the MAC layer, meanwhile, values of a same field in different conditions may be different.

For example, a MAC frame may include a time length field, a more data field in a frame control field, an acknowledgment policy field in a QoS control field and the like, wherein the more data field is used for indicating whether the TXOP holder has a subsequent frame to transmit to the TXOP responder after the current transmitted MAC frame, the acknowledgment policy field is used for indicating whether an immediate feedback is required after the TXOP responder receives the current transmitted MAC frame, and the time length field is used for a non-destination node monitoring the MAC frame to update a local NAV value according to a field value of the time length field.

A time length value of a MAC frame in a TXOP may be the remaining time length $t_{TXOP}^r$ ($t_{TXOP}^r>0$) of the TXOP at the moment when transmission of the MAC frame is ended.

Step 602: the TXOP responder receives the MAC frame, determines whether the TXOP holder has a subsequent frame to transmit, and determines whether an immediate feedback to the received MAC frame is required; if both are yes, step 603 is performed; if it is determined that the TXOP holder does not have a subsequent frame to transmit and an immediate feedback to the received MAC frame is required, step 604 is performed; otherwise, step 606 is performed.

Determining whether the TXOP holder has a subsequent frame to transmit may be performed according to a field value of a certain preset second field such as the more data field in the MAC frame. For example, when a value of the more data field is preset as 1, it is indicated that the TXOP holder has a subsequent frame to transmit to the TXOP responder, and when the value is 0, it is indicated that the TXOP holder does not have a subsequent frame to transmit to the TXOP responder. The method for determining whether the TXOP holder has a subsequent frame to transmit to the TXOP responder in this step may include: analyzing the field value of the more data field of the received MAC frame; when the field value is 1, determining that the TXOP holder has a subsequent frame to transmit to the TXOP responder; otherwise, determining that the TXOP holder does not has a subsequent frame to transmit to the TXOP responder.

Similarly to the method for determining whether the TXOP holder has a subsequent frame to transmit to the TXOP responder, whether a immediate feedback to the received MAC frame is required may also be determined according to a field value of the acknowledgment policy field in the MAC frame, and will not be described redundantly herein.

Step 603: the TXOP responder transmits a MAC response frame to the TXOP holder, wherein a value of a time length field in the MAC response frame may be the remaining time length $t_{TXOP}^{rr}$ ($t_{TXOP}^{rr}>0$) of the TXOP at the moment when transmission of the MAC response frame is ended.

Here, the MAC response frame may also be a MAC frame, which may be an ACK frame, a BA frame or a MAC frame of other types, and the so-called MAC response frame is merely to distinguish from the MAC frame transmitted from the TXOP holder to the TXOP responder.

After this step is performed and the TXOP holder receives the MAC response frame transmitted by the TXOP responder, the method switches back to the step 601, and the TXOP holder transmits a next MAC frame to the TXOP responder.

Step 604: the TXOP responder transmits a MAC response frame to the TXOP holder, wherein a preset first field in the MAC response frame carries a first identity, and the first identity is used for instructing a node monitoring the response frame to update a local NAV value to a first value; and step 605 is performed.

Generally, the first field may be a time length field, and the first identity may be 0 serving as the first identity, which is not limited here, as long as an other node monitoring the MAC frame may clear the local NAV value according to the first identity in the first field.

After this step is performed and the TXOP holder receives the MAC response frame transmitted by the TXOP responder, the TXOP holder has already learnt that release of a right to access to a channel resource is completed according to the MAC response frame, and step 605 is performed.

Step 605: the TXOP holder transmits a CF_End frame to instruct a node in the coverage of itself to clear a local NAV value, and ends service transmission to the TXOP responder.

According to the CF_End frame transmitted by the TXOP holder, a node not being the TXOP responder under the coverage of the TXOP holder clears the local NAV value so as to enter a channel access competition state, and service transmission from the TXOP holder to the TXOP responder is ended.

Step 606: if it is determined that the TXOP holder has a subsequent frame to transmit and an immediate feedback to the received MAC frame is not required, the TXOP responder analyzes the MAC frame and does not feed back a MAC response frame; at this moment, the method switches back to the step 601, and the TXOP holder transmits a next MAC frame to the TXOP responder; if it is determined that the TXOP holder does not have a subsequent frame to transmit and an immediate feedback to the received MAC frame is not required, the TXOP responder does not perform a feedback of a MAC response frame, and the TXOP holder ends service transmission to the TXOP responder in the current TXOP.

In the exchange process between the TXOP holder and the TXOP responder shown in the above FIG. 6, other nodes under the coverage of the TXOP holder and the TXOP responder continuously monitor a MAC frame all the time. A node under the coverage of the TXOP holder may monitor a MAC frame transmitted from the TXOP holder to the TXOP responder, and a node under the coverage of the TXOP responder may monitor a MAC response frame fed back from the TXOP responder to the TXOP holder.

Figure 7:
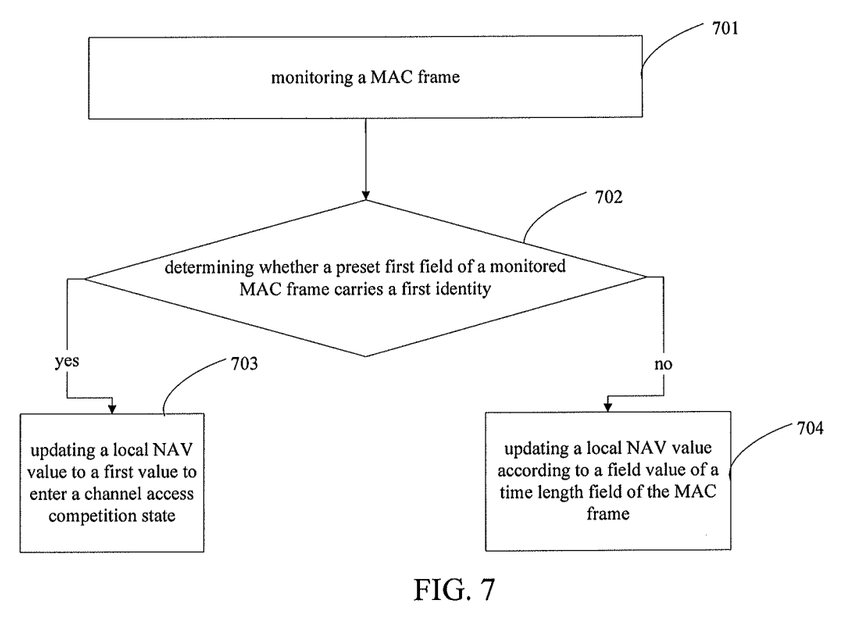
FIG. 7 is a schematic flowchart of a fourth method for performing NAV control on a node in an embodiment of the present disclosure.

In a monitoring process, a node may update a local NAV value according to a field value of a time length field of each monitored MAC frame. In this case, as shown in FIG. 7, a NAV control process of the other nodes under the coverage of the TXOP holder and the TXOP responder may include:

Step 701: monitoring a MAC frame.

Step 702: determining whether a preset first field of a monitored MAC frame carries a first identity; if yes, performing step 703; if not, performing step 704.

A MAC frame carrying a first identity in a preset first field is a MAC response frame transmitted by a TXOP responder to a TXOP holder after the TXOP responder receives a last MAC frame transmitted by the TXOP holder.

Preferably, the first field is a time length field, and the first identity may be 0.

Step 703: updating a local NAV value to a first value to enter a channel access competition state.

Step 704: updating a local NAV value according to a field value of a time length field of the MAC frame.

The updating the local NAV value according to the field value of the time length field of the MAC frame may include:

comparing, by a node, the field value of the time length field of the monitored MAC frame with the local NAV value, and taking the bigger one of the two values to update the local NAV, namely, if the field value of the time length field is bigger than the local NAV value, updating the local NAV value to the field value of the time length field, and if the field value of the time length field is not bigger than the local NAV value, not updating the local NAV value.

In the method shown in FIG. 7, a node only under the coverage of the TXOP holder may only monitor a MAC frame transmitted from the TXOP holder to the TXOP responder, so the local NAV is updated according to the MAC frame; a node only under the coverage of the TXOP responder may only monitor a MAC response frame transmitted from the TXOP responder to the TXOP holder, so the local NAV is updated according to the MAC response frame; and a node under the coverage of both the TXOP holder and the TXOP responder may monitor a MAC frame transmitted by the TXOP holder and a MAC response frame transmitted by the TXOP responder, so the local NAV is updated when each of the two MAC frames is monitored, thus when the TXOP holder and the TXOP responder perform a round of exchange of the MAC frames, the node needs to update the NAV value twice.

Figure 8:
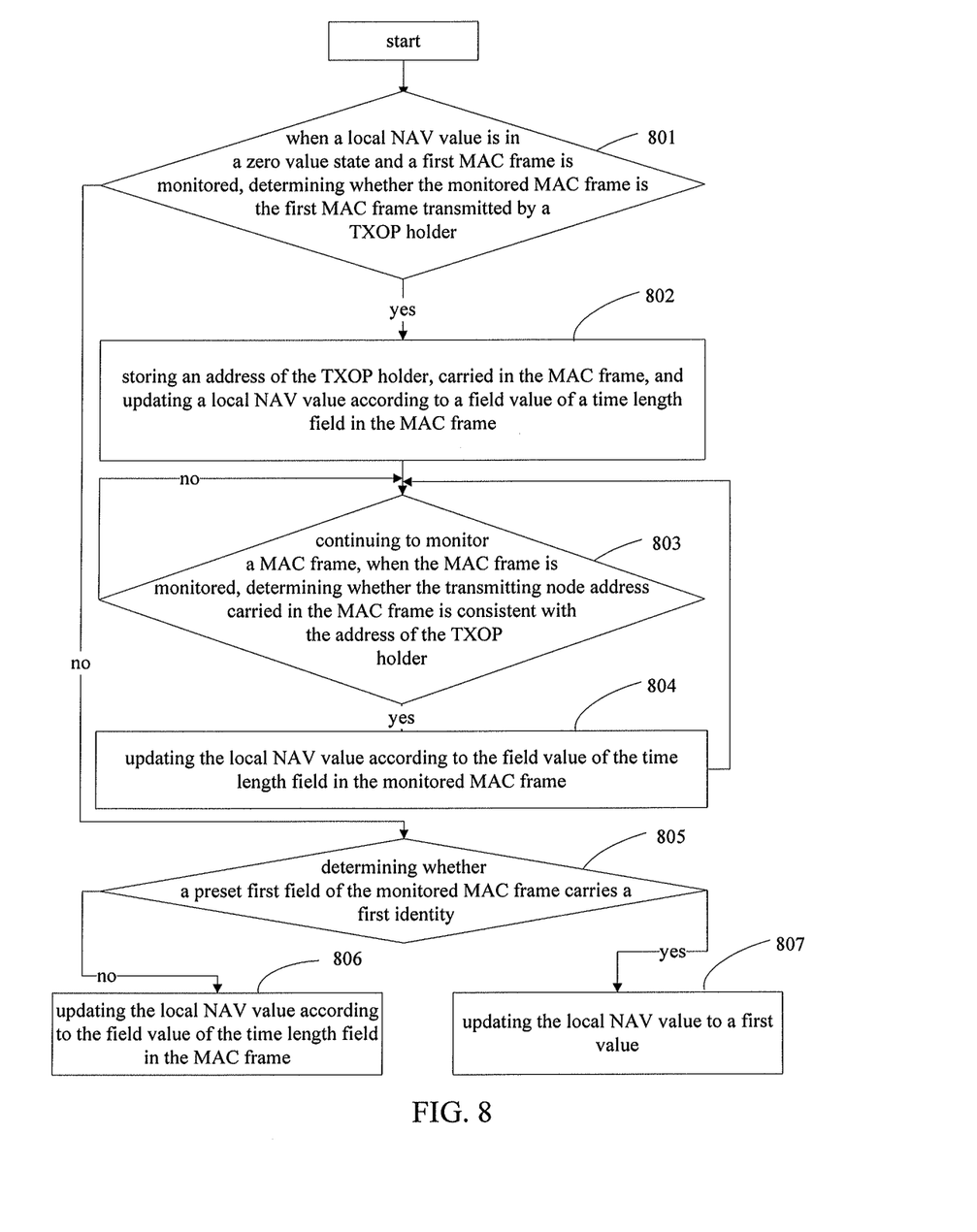
FIG. 8 is a schematic flowchart of a fifth method for performing NAV control on a node in an embodiment of the present disclosure.

Preferably, in order to reduce the times for updating the NAV value by the node under the coverage of both the TXOP holder and the TXOP responder and to reduce data processing pressure of the node under the coverage of both the TXOP holder and the TXOP responder, the NAV value updating of the node under the coverage of both the TXOP holder and the TXOP responder may be only controlled by the TXOP holder. In this case, as shown in FIG. 8, a processing flow of the node includes:

Step 801: when a local NAV value of a node is in a zero value state and a first MAC frame is monitored, determining whether the monitored MAC frame is the first MAC frame transmitted by a TXOP holder; if yes, performing step 802; if not, performing step 805.

When the local NAV value of the node is in the zero value state, it is indicated that the node may compete for channel access through a physical carrier monitoring mechanism. If a MAC frame is monitored before the node does not acquire the channel access, it is indicated that a channel has already been occupied by an other node; if it is learnt through analysis that the MAC frame is an RTS frame, it is indicated that an other node wins a TXOP, the MAC frame is the first MAC frame transmitted by the TXOP holder, and the node is under the coverage of the TXOP holder; otherwise, the node is under the coverage of a TXOP responder.

Here, a first frame transmitted by the TXOP holder is generally an RTS frame, so the determining in this step may be realized by determining whether the monitored MAC frame is the RTS frame.

Step 802: storing an address of the TXOP holder, carried in the MAC frame, and updating a local NAV value according to a field value of a time length field in the MAC frame; and performing step 803.

The address of the TXOP holder is a transmitting node address carried in the MAC frame.

Implementation of the updating the local NAV value in this step may be referred to the description in the step 704, and will not be described redundantly herein.

Step 803, continuing to monitor a MAC frame, when the MAC frame is monitored, determining whether the transmitting node address carried in the MAC frame is consistent with the address of the TXOP holder; if yes, performing step 804; if no, continuing to monitor a MAC frame.

Step 804, updating the local NAV value according to the field value of the time length field in the monitored MAC frame; and switching back to step 803 to continue to monitor a MAC frame, until the local NAV value is clear, and entering a channel access competition state.

Specific updating method may be referred to the related description in the step 704, and will not be described redundantly herein.

Through cyclic processing of the step 802 to the step 804, the node under the coverage of both the TXOP holder and the TXOP responder may update the local NAV value according to the MAC frame transmitted by the TXOP holder rather than the MAC frame transmitted by the TXOP responder, thereby reducing the data processing pressure of the node under the coverage of both the TXOP holder and the TXOP responder.

Step 805, determining whether a preset first field of the monitored MAC frame carries a first identity; if not, performing step 806; if yes, performing step 807.

Step 806: updating the local NAV value according to the field value of the time length field in the MAC frame.

Step 807: updating the local NAV value to a first value.

When the first value is 0, a node monitoring the MAC frame carrying the first identity in the preset first field updates the local NAV value to 0, and enters the channel access competition state.

When the first value is the sum of a time of a short inter-frame space and a time of transmission of a CF_End frame, the node monitoring the MAC frame carrying the first identity in the preset first field may continue decreasing the NAV value, until the NAV value is decreased to 0, and the node enters the channel access competition state.

The process that the hidden node only under the coverage of the TXOP responder performs local NAV value control is realized through the step 805 to the step 807, and the hidden node clears the local NAV value by monitoring the MAC frame carrying the first identity in the preset first field transmitted by the TXOP responder and enters the channel access competition state.

In the embodiments shown in FIG. 6 to FIG. 8, a transmission mode that the TXOP holder and the TXOP responder perform service transmission one-to-one is taken as an example, In actual application, the methods for performing NAV control on a node in the embodiments of the present disclosure may also be applied to a service transmission mode of performing transmission by a TXOP holder to multiple TXOP responders at divided times, or performing transmission by a TXOP holder to multiple TXOP responders at the same time. When the TXOP holder performs transmission to the multiple TXOP responders at the same time or at divided times, the transmission process may be decomposed into multiple transmission processes that the TXOP holder and the TXOP responder perform service transmission one to one. Each decomposed transmission process that the TXOP holder and the TXOP responder perform service transmission one to one may use the methods for performing node NAV control as shown in FIG. 6 to FIG. 8 of the present disclosure correspondingly, and will not be described redundantly herein.

Corresponding to the above-mentioned methods, the embodiments of the present disclosure also provide devices for performing NAV control on a node.

Figure 9:
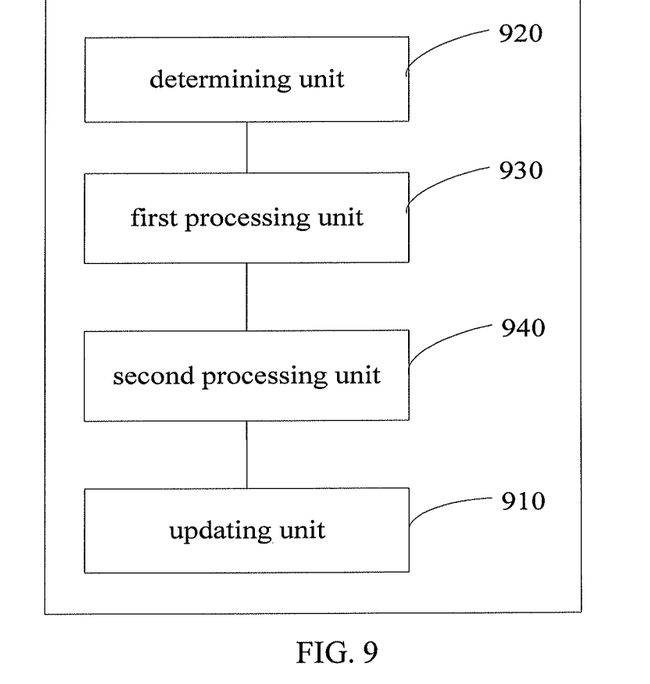
FIG. 9 is a schematic diagram of a structure of a first device for performing NAV control on a node in an embodiment of the present disclosure.

FIG. 9 is a schematic diagram of a structure of a first device for performing NAV control on a node in an embodiment of the present disclosure. The device may be arranged in a node in the coverage of a TXOP responder in a TXOP, and preferably, may be arranged in a hidden node in the coverage of the TXOP responder rather than in the coverage of a TXOP holder in the TXOP. The device includes:
an updating unit 910, configured to update a local NAV value to a preset first value when it is determined that a preset first field of a monitored MAC frame carries a first identity, wherein the first value is less than a current local NAV value and the MAC frame of which the preset first field carriers the first identity is transmitted by a TXOP responder after receiving a last MAC frame transmitted by a TXOP holder.

Preferably, as shown in FIG. 9, the device may further include:
a determining unit 920, configured to determine, when the local NAV value is in a zero value state and a first MAC frame is monitored, whether the monitored MAC frame is the first MAC frame transmitted by the TXOP holder;
a first processing unit 930, configured to store an address of the TXOP holder carried in the MAC frame when the monitored MAC frame is the first MAC frame transmitted by the TXOP holder, update the local NAV value according to a field value of a time length field in the MAC frame, and update the local NAV value according to a field value of a time length field in a monitored MAC frame when the MAC frame is monitored subsequently and it is determined that an address of a transmitting node carried in the MAC frame is consistent with the address of the TXOP holder; and
a second processing unit 940, configured to determine whether the preset first field of the monitored MAC frame carries the first identity when the monitored MAC frame is not the first MAC frame transmitted by the TXOP holder, and update the local NAV value according to a field value of a time length field in the MAC frame if the first identity is not carried, wherein the updating operation is performed by the updating unit if the first identity is carried.

Preferably, the determining unit realizes determining whether the monitored MAC frame is the first MAC frame transmitted by the TXOP holder by determining whether the monitored MAC frame is an RTS frame.

Preferably, the second processing unit may realize updating the local NAV value according to a field value of a time length field in the MAC frame in the following modes:
updating the local NAV value to the field value of the time length field when it is determined that the field value of the time length field in the MAC frame is bigger than the local NAV value; and
not updating the local NAV value when it is determined that the field value of the time length field in the MAC frame is not bigger than the local NAV value.

Figure 10:
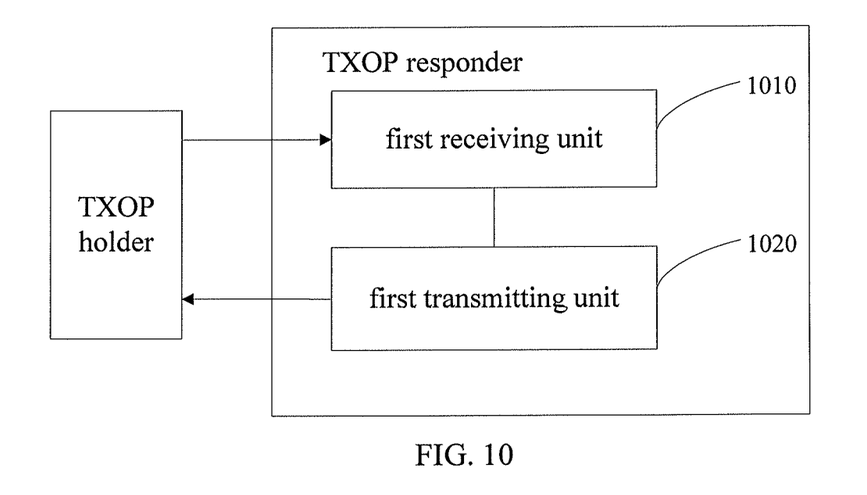
FIG. 10 is a schematic diagram of a structure of a second device for performing NAV control on a node in an embodiment of the present disclosure.

FIG. 10 is a schematic diagram of a structure of a second device for performing NAV control on a node in an embodiment of the present disclosure. The device may be arranged in a TXOP responder. The device includes:
a first receiving unit 1010, configured to receive a MAC frame transmitted by a TXOP holder;
a first transmitting unit 1020, configured to transmit a MAC response frame corresponding to the MAC frame to the TXOP holder when it is determined according to a field value of a preset second field in the MAC frame that the MAC frame is a last MAC frame transmitted by the TXOP holder, wherein a preset first field of the MAC response frame carries a first identity, and the first identity is used for instructing a node monitoring the MAC response frame to update a local NAV value to a first value.

Figure 11:
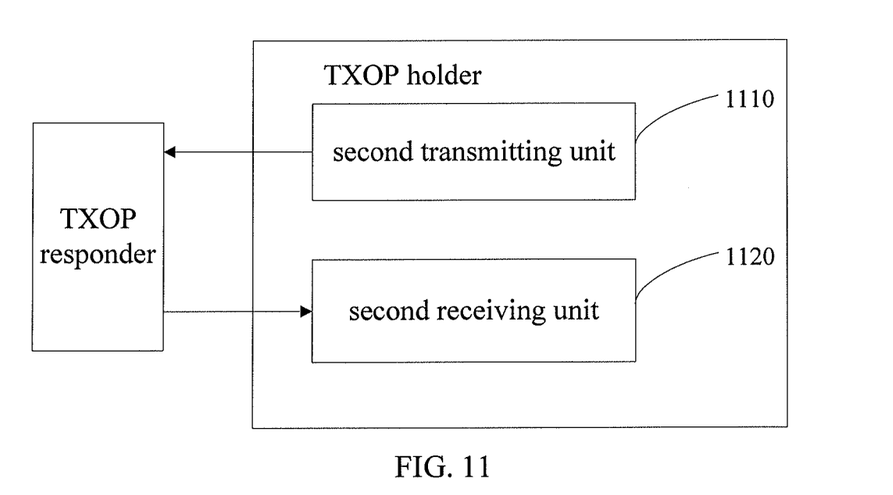
FIG. 11 is a schematic diagram of a structure of a third device for performing NAV control on a node in an embodiment of the present disclosure.

FIG. 11 is a schematic diagram of a structure of a third device for performing NAV control on a node in an embodiment of the present disclosure. The device may be arranged in a TXOP holder. The device includes:
a second transmitting unit 1110, configured to transmit a last MAC frame to a TXOP responder, wherein a field value of a preset second field in the last MAC frame is used for indicating for the TXOP responder that the MAC frame is the last MAC frame transmitted by a TXOP holder;
a second receiving unit 1120, configured to receive a MAC response frame transmitted by the TXOP responder and corresponding to the last MAC frame, wherein a preset first field of the MAC response frame carries a first identity, and the first identity is used for instructing a node monitoring the MAC response frame to update a local NAV value to a first value.

In addition, an embodiment of the present disclosure also provides a node, including:
an updating unit, configured to update a local NAV value to a preset first value when it is determined that a preset first field of a monitored MAC frame carries a first identity, wherein the first value is less than a current local NAV value and the MAC frame of which the preset first field carriers the first identity is transmitted by a TXOP responder after receiving a last MAC frame transmitted by a TXOP holder.

In addition, the node may further include:
a first receiving unit, configured to receive a MAC frame transmitted by a TXOP holder;
a first transmitting unit, configured to transmit a MAC response frame corresponding to the MAC frame to the TXOP holder when it is determined according to a field value of a preset second field in the MAC frame that the MAC frame is a last MAC frame transmitted by the TXOP holder, wherein a preset first field of the MAC response frame carries a first identity, and the first identity is used for instructing a node monitoring the MAC response frame to update a local NAV value to a first value.

In addition, the node may further include:
a second transmitting unit, configured to transmit a last MAC frame to a TXOP responder, wherein a field value of a preset second field in the last MAC frame is used for indicating for the TXOP responder that the MAC frame is the last MAC frame transmitted by a TXOP holder;
a second receiving unit, configured to receive a MAC response frame transmitted by the TXOP responder and corresponding to the last MAC frame, wherein a preset first field of the MAC response frame carries a first identity, and the first identity is used for instructing a node monitoring the MAC response frame to update a local NAV value to a first value Through the updating unit, the node may serve as a node which is under the coverage of the TXOP holder or the TXOP and is not the TXOP holder or the TXOP responder node in the TXOP; through the first receiving unit and the first transmitting unit, the node may serve as the TXOP responder in the TXOP to cooperate with the TXOP holder to perform service transmission; and through the second transmitting unit and the second receiving unit, the node may serve as the TXOP holder in the TXOP to cooperate with the TXOP responder to perform service transmission.

Figure 12:
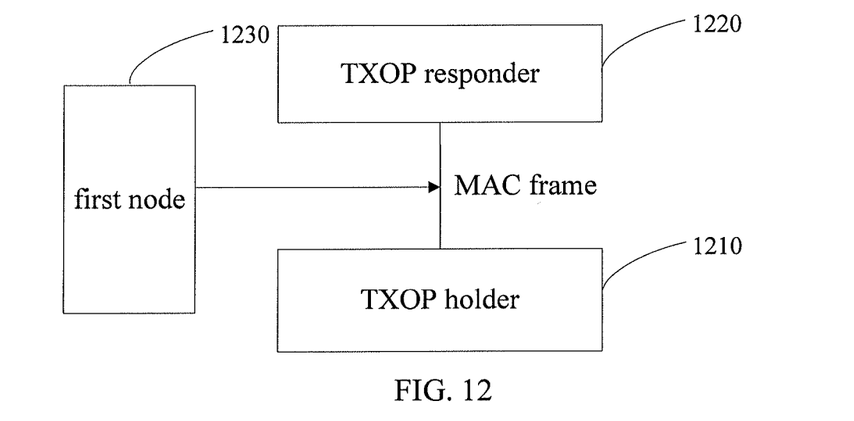
FIG. 12 is a schematic diagram of a structure of a system for performing NAV control on a node in an embodiment of the present disclosure.

In addition, an embodiment of the present disclosure also provides a system for performing NAV control on a node, as shown in FIG. 12, including:
a TXOP holder 1210, configured to transmit a last MAC frame to a TXOP responder, wherein a field value of a preset second field in the last MAC frame is used for indicating for the TXOP responder that the MAC frame is the last MAC frame transmitted by the TXOP holder, and receive a MAC response frame transmitted by the TXOP responder and corresponding to the last MAC frame, wherein a preset first field of the MAC response frame carries a first identity and the first identity is used for instructing a node monitoring the MAC response frame to update a local NAV value to a first value;
the TXOP responder 1220, configured to receive a MAC frame transmitted by the TXOP holder and transmit a MAC response frame corresponding to the MAC frame to the TXOP holder when it is determined according to a field value of a preset second field in the MAC frame that the MAC frame is a last MAC frame transmitted by the TXOP holder;
a first node 1230, configured to update a local NAV value to a preset first value when it is determined that a preset first field of a monitored MAC frame carries a first identity, wherein the first value is less than a current local NAV value.

Preferably, in the above-mentioned devices, node and system, the first value may be 0 or the sum of a time of a short inter-frame space and a time of transmission of a CF_End frame.

The preset second field may be a more data field, the preset first field may be a time length field, and the first identity may be 0.

In the above-mentioned devices, node and system, when the TXOP responder receives the last MAC frame transmitted by the TXOP holder, the TXOP responder transmits the MAC response frame carrying the first identity in the preset first field, and when the node in the coverage of the TXOP responder monitors the MAC frame, the node updates the local NAV value to the first value. Therefore, even if the TXOP holder abandons the right to access to the channel resource ahead of time, the hidden node may update the local NAV value to the first value according to the MAC response frame transmitted by the TXOP responder and carrying the first identity in the first field, so that the time when the hidden node enters the channel access competition state is not later than the time when the node under the coverage of the TXOP holder enters the channel access competition state, and all the nodes in the coverage of the TXOP holder and the TXOP responder may enter the channel access competition state timely, thereby solving the problem that the hidden node is unable to enter the channel access competition state timely, namely solving the problem of regional discrimination of the node.

It should be appreciated for those of ordinary skill in the art that the processes of the methods of the above-mentioned embodiments may be implemented with a computer program instructing corresponding hardware, the program may be stored in a readable storage medium, and the corresponding steps in the above-mentioned methods are performed when the program is executed. The storage medium may be a ROM/RAM, a magnetic disk, an optical disk, or the like.

The foregoing descriptions are merely preferred implementation manners of the present disclosure. It should be noted that, for those of ordinary skill in the art, a plurality of improvements and modifications may be made without departing from the principle of the present disclosure. These improvements and modifications should be included in the protection scope of the present disclosure.

What is claimed is:
1. A method for performing network allocation vector (NAV) control on a node, executed by the node, comprising:
updating a local NAV value to a preset first value when it is determined that a preset first field of a monitored media access control (MAC) frame carries a first identity, wherein the first value is less than a current local NAV value; and the MAC frame of which the preset first field carries the first identity is transmitted by a transmit opportunity (TXOP) responder after receiving a last MAC frame transmitted by a TXOP holder; and
entering a channel access competition state when the local NAV value decreases to zero;
determining, when the local NAV value is in a zero value state and a first MAC frame is monitored, whether the monitored MAC frame is the first MAC frame transmitted by the TXOP holder;
storing an address of the TXOP holder carried in the MAC frame when the monitored MAC frame is the first MAC frame transmitted by the TXOP holder, updating the local NAV value according to a field value of a time length field in the MAC frame, and updating the local NAV value according to a field value of a time length field in a monitored MAC frame when the MAC frame is monitored subsequently and it is determined that an address of a transmitting node carried in the MAC frame is consistent with the address of the TXOP holder; and
determining whether the preset first field of the monitored MAC frame carries the first identity when the monitored MAC frame is not the first MAC frame transmitted by the TXOP holder, updating the local NAV value according to a field value of a time length field in the MAC frame if the first identity is not carried, and performing the step of updating the local NAV value to the first value if the first identity is carried.
2. The method according to claim 1, wherein the first value is zero or the sum of a time of a short inter-frame space and a time of transmission of a CF_End frame.
3. The method according to claim 1, wherein the determining whether the monitored MAC frame is the first MAC frame transmitted by the TXOP holder comprises:
determining whether the monitored MAC frame is an RTS frame.
4. The method according to claim 1, wherein the preset first field is a time length field and the first identity is zero.
5. The method according to claim 1, wherein the updating the local NAV value according to a field value of a time length field in the MAC frame comprises:
updating the local NAV value to the field value of the time length field when it is determined that the field value of the time length field in the MAC frame is bigger than the local NAV value; and
not updating the local NAV value when it is determined that the field value of the time length field in the MAC frame is not bigger than the local NAV value.

6. A device for performing network allocation vector (NAV) control on a node, comprising: a processor and a memory storing programming instructions for execution by the processor, the processor configured to execute the programming instructions to:

update a local NAV value to a preset first value when it is determined that a preset first field of a monitored media access control (MAC) frame carries a first identity, wherein the first value is less than a current local NAV value and the MAC frame of which the preset first field carries the first identity is transmitted by a transmit opportunity (TXOP) responder after receiving a last MAC frame transmitted by a TXOP holder; and enter a channel access competition state when the local NAV value decreases to zero;

determine, when the local NAV value is in a zero value state and a first MAC frame is monitored, whether the monitored MAC frame is the first MAC frame transmitted by the TXOP holder;

store an address of the TXOP holder carried in the MAC frame when the monitored MAC frame is the first MAC frame transmitted by the TXOP holder, update the local NAV value according to a field value of a time length field in the MAC frame, and update the local NAV value according to a field value of a time length field in a monitored MAC frame when the MAC frame is monitored subsequently and it is determined that an address of a transmitting node carried in the MAC frame is consistent with the address of the TXOP holder; and determine whether the preset first field of the monitored MAC frame carries the first identity when the monitored MAC frame is not the first MAC frame transmitted by the TXOP holder, and update the local NAV value according to a field value of a time length field in the MAC frame if the first identity is not carried, and update the local NAV value to the first value if the first identity is carried.

7. The device according to claim 6, wherein the first value is zero or the sum of a time of a short inter-frame space and a time of transmission of a CF_End frame.

8. The device according to claim 6, wherein the processor realizes determining whether the monitored MAC frame is the first MAC frame transmitted by the TXOP holder by determining whether the monitored MAC frame is an RTS frame.

9. The device according to claim 6, wherein the preset first field is a time length field and the first identity is 0.

10. The device according to claim 6, wherein the processor realizes updating the local NAV value according to a field value of a time length field in the MAC frame in the following modes:

updating the local NAV value to the field value of the time length field when it is determined that the field value of the time length field in the MAC frame is bigger than the local NAV value; and not updating the local NAV value when it is determined that the field value of the time length field in the MAC frame is not bigger than the local NAV value.

* * * * *